United States Patent [19]
Dubuc

[11] Patent Number: 5,791,713
[45] Date of Patent: Aug. 11, 1998

[54] MOBILE FABRICATION UNIT

[76] Inventor: Paul C. Dubuc, 2 Overlook Dr., Bristol, R.I. 02809

[21] Appl. No.: 686,554

[22] Filed: Jul. 26, 1996

[51] Int. Cl.$^6$ ............................................. B60P 3/14
[52] U.S. Cl. .................... 296/24.1; 296/181; 296/215
[58] Field of Search .................. 296/24.1; 209/900, 209/297, 298; 248/124.1, 419, 420, 429; 182/225; 144/287; 269/1, 10, 36, 41, 56, 289 R, 298, 299, 909, 17, 910; 52/79.1, 36.1, 143; 108/137, 143; 51/453

[56]       References Cited
         U.S. PATENT DOCUMENTS

| | | | |
|---|---|---|---|
| 2,636,526 | 4/1953 | Madden | 269/297 |
| 3,525,183 | 8/1970 | Gargrave | 451/453 |
| 3,965,933 | 6/1976 | Beaudin | 137/875 |
| 4,538,995 | 9/1985 | Fryer . | |
| 4,556,247 | 12/1985 | Mahaffey . | |
| 4,570,915 | 2/1986 | O'Hem | 269/295 |
| 4,643,476 | 2/1987 | Montgerard . | |
| 4,660,477 | 4/1987 | Kortering et al. | 108/137 |
| 5,063,859 | 11/1991 | Rader | 105/340 |
| 5,120,378 | 6/1992 | Porter et al. . | |
| 5,314,200 | 5/1994 | Phillips | 280/400 |
| 5,379,816 | 1/1995 | Charlton | 144/287 |
| 5,402,860 | 4/1995 | Fry | 182/225 |
| 5,507,122 | 4/1996 | Aulson . | |

FOREIGN PATENT DOCUMENTS 813492   5/1959   United Kingdom ................... 296/215

*Primary Examiner*—D. Glenn Dayoan
*Assistant Examiner*—Jason Morrow
*Attorney, Agent, or Firm*—Michael D. Bednarek Kilpatrick Stockton LLP

[57]        ABSTRACT

A mobile unit for fabricating solid surface construction materials is provided, and is characteristically equipped in the manner of a portable fabrication shop and is brought directly to a worksite. Therefore, solid surface construction materials can be fabricated onsite, instead of at a remote fabrication shop. In the fabrication process according to the present invention, dimensional information is laid out directly onto the solid surface material stock. This eliminates the frequently inaccurate use of a temporary template, as in the known art.

19 Claims, 4 Drawing Sheets

MOBILE FABRICATION UNIT

BACKGROUND OF THE INVENTION

1. Field of the Invention

The present invention relates to a mobile fabrication unit for use in fabricating solid surface materials, especially construction materials.

2. Description of Related Art

In recent years solid surface construction materials have become increasingly popular, especially for use as a countertop surface. The term "solid surface" construction material refers to a number of different products, such as CORIAN by Dupont, FOUNTAINHEAD, and other synthetic materials.

The fabrication of such products may be tightly controlled, for example. Dupont, for example, sells CORIAN only to certified fabricators who have fabrication shops that meet certain strict standards set by Dupont.

However, the traditional system and method for fabricating such sheet materials typically takes several days to complete.

First, a crew of people must take the necessary measurements for a particular job, such as measuring out a countertop. This typically involves a process referred to as "templating," namely, using particle board, plywood, cardboard or other disposable material, and creating a template, or a pattern, for cutting the solid surface material stock as required. The template is then taken back to an offsite fabrication shop where the solid surface material is fabricated accordingly. The thusfabricated solid surface material is then transported back to the worksite and installed. Often, the above-described templating process is relatively inaccurate, so measuring errors and the like occur, and must be compensated for in an additional onsite final fitting process. Because of this, the entire process typically requires more than one week to complete. This is highly problematic from the fabricator's perspective in terms of staffing and work flow. Moreover, from the customer's point of view, the large amount of time and labor required is inconvenient and, indeed, disruptive. For these reasons, it is believed that the conventional fabrication process may restrict, or even discourage, customers from purchasing and installing solid surface construction materials, such as CORIAN.

SUMMARY OF THE INVENTION

It is therefore an object of the present invention to develop a system and method for faster and more efficient fabrication of solid surface materials. This objective is achieved by providing a mobile fabrication system and a fabrication process according to the present invention.

The system of the present invention involves a mobile unit that is either self-propelled (such as a stepvan or panel truck) or adapted to be pulled by a vehicle, such as a trailer pulled by pickup truck or the like. The mobile unit according to the present invention characteristically contains or is otherwise provided with all of the equipment necessary to fabricate solid surface construction materials.

The process according to the present invention involves the unique step of measuring out dimensional information directly onto the solid surface material itself, without an intermediate template as discussed above. This is made possible because the mobile unit can be brought directly to a worksite. Therefore, the solid surface material stock can be brought to the worksite and can be fabricated on location, rather than needing to bring a temporary, and frequently inaccurate, template back to an offsite shop where fabrication is carried out, as in the known art. This increases the accuracy and speed of fabrication.

These and other objects and novel features of the present invention will become more apparent from the following detailed description, taken in conjunction with the accompanying drawings.

DETAILED DESCRIPTION OF THE PREFERRED EMBODIMENTS

Figure 1:
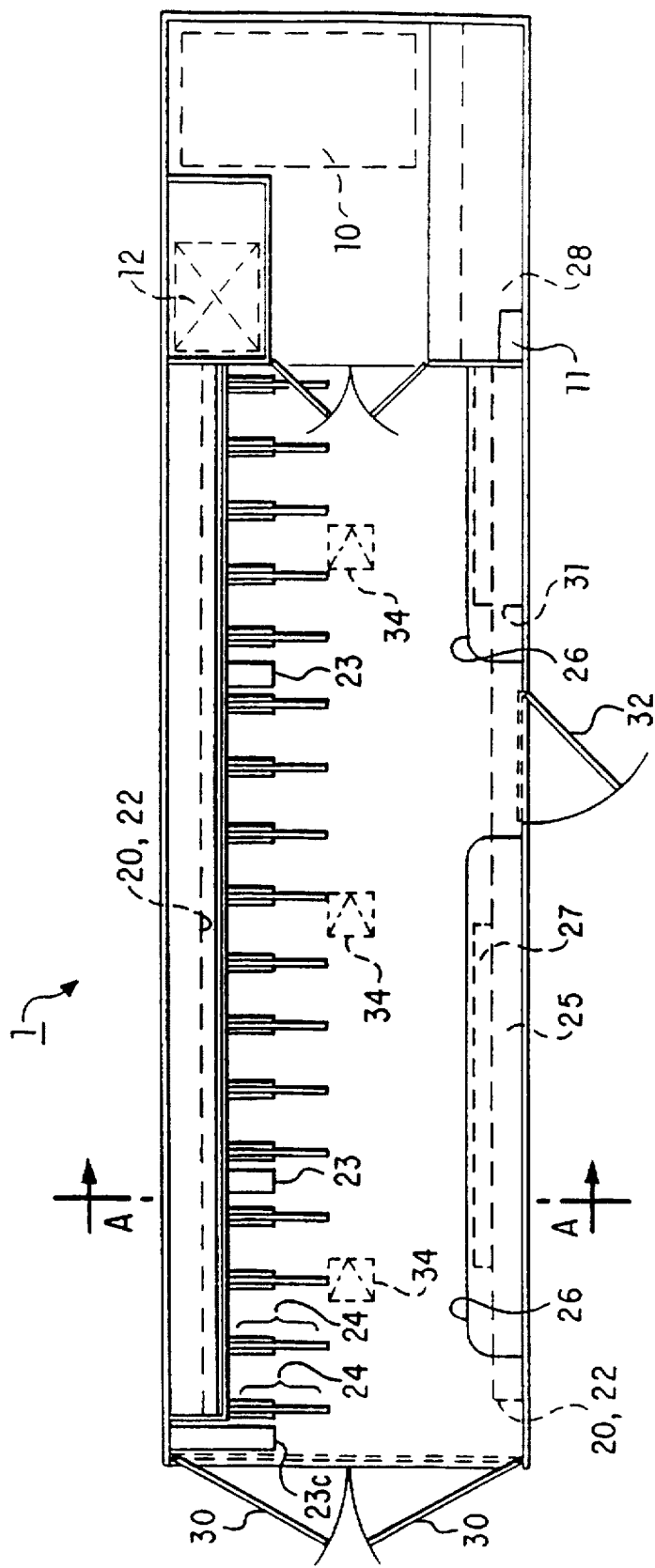
FIG. 1 is plan view of the mobile fabrication unit according to the present invention.
Figure 2:
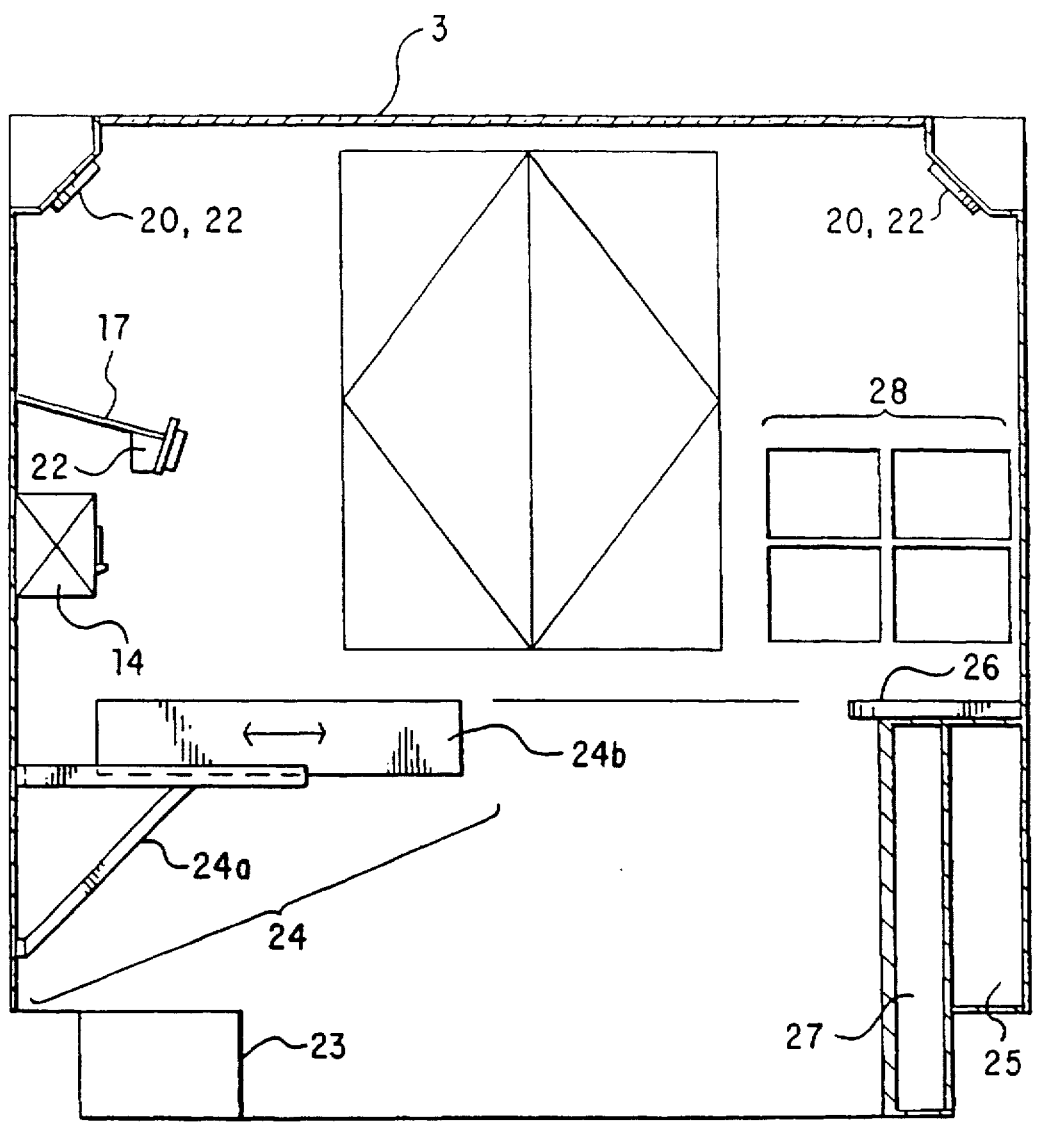
FIG. 2 is a cross-sectional view of the fabrication unit taken at line A—A in FIG. 1.
Figure 3:
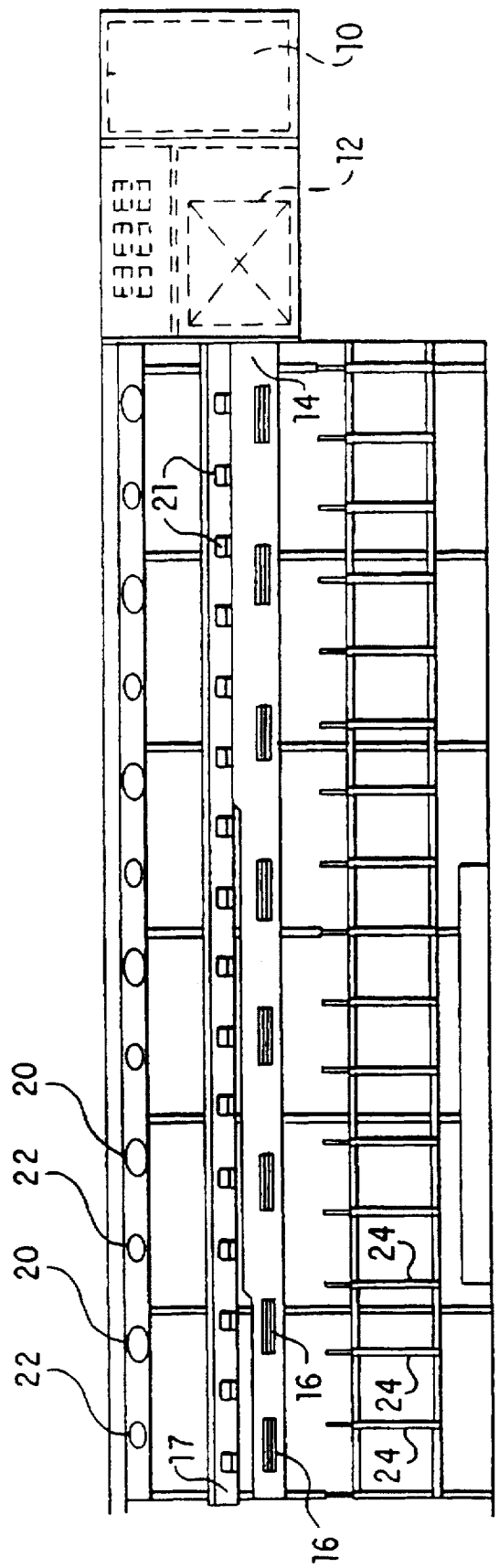
FIG. 3 is a cross-sectional view showing the left side of the interior of the fabrication unit shown in FIG. 1.

The system according to the present invention includes a housing, preferably in the form of a wheeled vehicle body, such as trailer 1, as seen in FIGS. 1–4. For clarity, the wheels of trailer 1 are not shown.

Also, for the purpose of discussion, only the example of a trailer is discussed here. However, it is contemplated and emphasized that an alternative arrangement of the present invention may, for example, take the form of a motor vehicle provided with an engine, a steering system, etc. Such motor vehicles may include conventional panel trucks or stepvans having their interiors equipped and laid out according to the present invention.

The type of vehicle that can be used is variable, and corresponds to a desired capacity for fabrication and available manpower. For example, a smaller step van may be manned by even a single worker for smaller jobs, whereas a longer trailer may be manned by 2 to 4 workers, and offers an increased fabrication capacity.

The trailer 1 has transparent or translucent wall and/or ceiling panels (not shown) which transmit ambient exterior light, such as sunlight, to the interior of the trailer to permit natural light illumination thereof. This helps to reduce power consumption, and, therefore, operating costs, by reducing the need for electric interior lights.

In addition, some solid surface material stock is supplied in a variety of colors (e.g., Corian is supplied in 51 colors). Therefore, in processing and fabricating the solid surface material, color matching is an important issue. Thus, it is very useful to provide natural sunlight to the interior of the trailer for the purpose considering the "natural" coloring of the solid surface material.

The trailer 1 also includes a power supply, such as a conventional gas-powered generator 10, for generating electricity. Alternatively, a power line hookup may be provided (not shown), whereby electrical power can be drawn from an onsite source, such as from power cables located onsite. Also, a portable power generator may be used, according to the present invention. The power requirements according to the present invention are expected to be highly variable. However, presently contemplated power loads are about 7500-8000 kW.

A plurality of conventional electrical outlets 21 are provided at various convenient locations within the trailer 1, such as at intervals along an edge of tool shelf 17, discussed further below. The electrical outlets are provided, for example, in quad-clusters of conventional, threepronged outlets. All of the electrical outlets are electrically connected to the power supply, such as the gas generator 10.

An active (for example, fan-driven) ventilation unit 12, preferably powered by the aforementioned power supply, is provided and preferably includes an air filtering mechanism (not illustrated) to remove particulate matter, especially saw dust, generated during the fabrication process. In particular, the ventilation system unit draws air out from the interior of the trailer 1 and discharges it to the exterior thereof. The air is preferably filtered by the aforementioned air filtering mechanism before being discharged. The air filtering mechanism may be conventional, as long as it is effective for substantially removing the particulate matter associated with cutting and sanding the solid surface construction material.

In particular, the ventilation system according to the present invention includes an elongate exhaust duct 14 connected to the fandriven ventilation unit 12. The exhaust duct 14 preferably extends along the longitudinal length of the trailer 1, and more preferably extends substantially the entire longitudinal length of the trailer. The exhaust duct has a plurality of apertures 16 provided therein, through which air is taken in from the interior of the trailer 1. The apertures 16 can be independently opened or closed in order to provide or even concentrate airflow in particular portions of the interior.

In keeping with the desire for increased efficiency according to the present invention, the ventilation unit 12 is actuable by a pull-cable extending along the longitudinal length of the trailer 1. The pull-cable is connected to a microswitch or the like to provide pull-on/pull-off operation of the ventilation unit 12. Thus, a worker can pull the cable from virtually anywhere along the length of the trailer, without having to go to a specific switch and possibly interfering with coworkers.

In addition, passive vents 34 may be provided in, for example the ceiling of trailer 1. The provision of vents 34 provides a consistent airflow inwardly from the vents 34 and outwardly through the apertures 16 in the exhaust duct 14.

The trailer 1 is equipped with a plurality of conventional, electricpowered tools (not shown) for fabricating the solid surface material, powered by (i.e., plugged into) the aforementioned electrical outlets 21. The tools are characteristically distributed throughout the interior of the trailer 1 so as to be "within arm's reach" from virtually any location. This is advantageous because, again, workers do not need to move very far, if at all, within the trailer 1 to reach a required tool. Therefore, one worker is less likely to interfere with another's work. Accordingly, productivity increases. The tools provided in the trailer are those conventionally used for solid surface material fabrication, such as routers, sanders, and the like. Each tool is held on a tool shelf 17 mounted on a wall portion of the trailer.

The trailer 1 is also provided with a plurality of heat lamps 20 distributed through the interior thereof. The heat lamps raise the temperature within the trailer to promote rapid glue curing in a gluing step of the fabrication process. The heat lamps 20 also warm the interior of the trailer 1 in cold weather months to make working conditions more comfortable for the crew working therein.

In addition to the heat lamps 20, the trailer 1 may be usefully provided with at least one hot air heater unit (not shown) which is conveniently located to heat the air within the trailer 1.

Also, the trailer 1 may be provided with one or more "hot boxes" (not shown). A hot box is a small, toaster oven-sized unit which has an interior space which can be selectively heated. A hot box is particularly useful for heating adhesive materials used in the fabrication process to a useful temperature level, particularly in cold weather months.

The trailer 1 may also be provided with lighting units to provide, or supplement, the light within the trailer 1. The lighting units may be, for example, a plurality of conventional lighting units 22 using incandescent or fluorescent light bulbs. The lighting units 22 are distributed about the interior of the trailer 1, such as along one or both of the side walls.

The heat lamps 20 and the lighting units 22, as well as the hot air heater(s), tools, and hot box(es), are powered by the aforementioned generator 10 or other power supply. Thus, it is noted here that the generator 10, (or alternative power supply), necessarily must be of sufficient capacity to adequately power the equipment connected thereto.

The electrical system in the trailer 1 preferably includes two circuits, each "guarded" by a respective circuit breaker panel from which power supply is selectively controlled. One circuit includes the utilities, such as the lighting units, the heat lamps, the hot air blowers, the hot boxes, etc. The second circuit includes the electrical outlets, and, therefore, the fabrication tools, such as routers, sanders, and the like.

Thus, the heat lamps 20 and lighting units 22 may be turned on and off from one of the circuit breaker boxes, which may be located at the forward end of the trailer 1, for example. In an alternative arrangement, the heat lamps 20 and lighting units 22 may be operated by a pull cable system similar to that used with the ventilation system 12, with similar advantages in increasing efficiency.

In a typical arrangement, the heat lamps 20 in the forward and rearward "halves" of the trailer 1 can be independently turned on and off. The lighting units 22 are collectively turned on and off.

Finally, the trailer 1 includes several shelf spaces and work bench areas.

In particular, one side of the trailer is provided with a plurality of spaced apart and generally aligned support struts 24. In a particular example, the plurality of support struts 24 extend in a transverse direction of the trailer 1 and are substantially parallel to one another. Collectively, the support struts 24 support the solid surface material while it is being fabricated. When the solid surface material stock is preprovided with a protruding element, such as a washbasin bowl, the protrusion may be arranged to fit between the support struts 24 so that the solid surface material is still conveniently and securely supported while being fabricated.

The support struts 24 are preferably adjustable with respect to height, direction of extension in a horizontal plane, and angle of extension in a vertical plane. They may, for example, slide along guide rails, grooves, or the like, and lock into a desired position. This can be done by conventional positional controlling mechanisms such as friction locks or the like.

In a preferred example, each support strut comprises a first portion 24a which is attached to the trailer wall, and second, slidingly extensible portion 24b which extends in substantially the same direction as the first portion 24a. Thus, the effective length of transverse extension of each support strut 24 can be selectively extended. Each second portion 24b may, for example, be provided with a cleat or other protrusion (not shown) along its bottom edge. The cleat slidingly engages a corresponding groove or slot in first portion 24a (not shown), such that second portion 24b can slide back and forth, but cannot be pulled in a direction perpendicular to the direction of sliding (i.e., directly upwardly).

In a particularly preferable arrangement, each second portion 24b is made from a sacrificial material, such as particle board, or lesser quality wood. However, the sacrifical material chosen must maintain sufficient rigidity to securely provide support. The use of a sacrificial material here is particularly useful because, when the solid surface material is trimmed with a router saw and the like, the underlying second portion 24b can simply be cut through, without needing to constantly reposition a work piece to avoid the second portion 24b. Thus, each second portion 24b becomes progressively nicked and partially cut, and is simply and conveniently disposed of when its structural integrity is sufficiently degraded.

At least one workbench area 26 is provided along the side of the trailer opposite the plurality of support struts. Preferably, this workbench comprises at least one elongated surface extending along the side of the interior of trailer 1. The aforementioned hot box can be placed on the workbench 26.

In addition to the foregoing features, convenience items, such as storage cabinets and work shelves and storage shelves may be provided in the interior of the trailer as required or as desired. For example, a storage cabinet 28 extends forward substantially to the front end of the trailer 1 for storing elongate materials such as particle board strips, straight edges, and bench strips.

Also, underneath the rear workbench 26, slot compartments 25 and 27 may be provided for storing particle board stock and solid surface material stock respectively.

Figure 4:
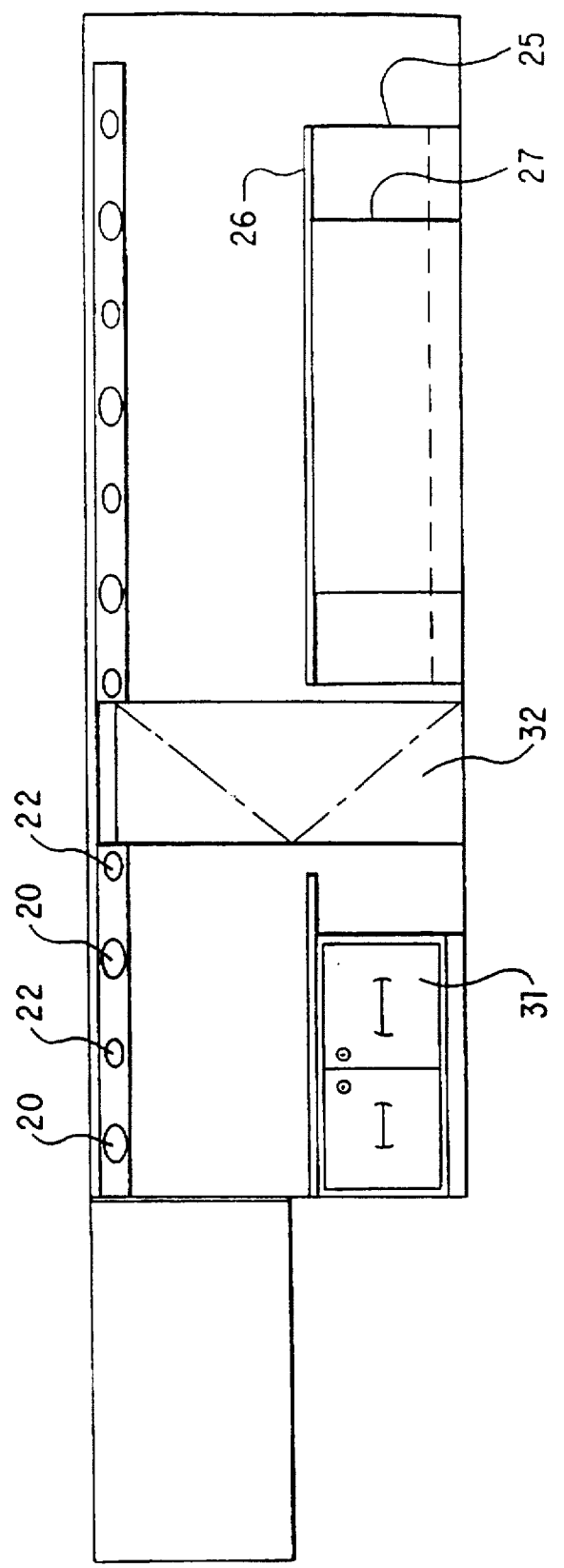
FIG. 4 is a cross-sectional view showing the right side of the interior of the fabrication unit.

An additional cabinet 31 may be provided under the forward workbench 26 (see FIG. 4).

Finally, the trailer 1 has at least one, and preferably two doors to allow entry into the interior thereof. A door 30 is provided at the rear end of trailer 1. Door 30 is preferably sized so as to permit full sized pieces of sheet construction material stock to pass freely therethrough. Also, a door 32 may be provided at the side of the trailer 1 to allow workers to enter and exit trailer 1.

Both doors are preferably left open, but are installed with a curtain (not shown) thereacross, similar to the type seen in the doorways of walk-in commercial freezers. Such curtains are commercially available from, for example, Grangers, an industrial supply store, under the name "Vinyl Slat Doory". In general, the contemplated curtains include a plurality of flexible strips or slats made of plastic or vinyl or the like and hang, at rest, such that the individual plastic strips collectively shut off the doorway. This is important to retain heat in the trailer, for example. Moreover, the curtain structure enables a worker who may have both hands full to simply walk through the curtain (i.e., between the individual plastic strips) to enter and exit the trailer, without having to open and close a door. In addition, the curtains offer protection to those immediately outside the doors from being sprayed with debris thrown up from the routers and the like.

Finally, the curtains, depending on the material of manufacture, offer privacy to the workers in the trailer. In a preferable arrangement, in this regard, a lower portion of the curtain strips is substantially opaque to provide privacy, and an upper portion is transparent or translucent to permit exterior light to enter the trailer.

The fabrication process according to the present invention involves bringing the trailer to the worksite, forming a template directly on the solid surface material, cutting, while in the trailer, the solid surface material according to the template laid out thereon, forming the nose and head portion on the sheet material, and installing the fabricated solid surface material. Preferably, the trailer is brought within about 100 yards of the worksite because of the need to carry the solid surface material back and forth between the worksite and the trailer. Since this is frequently done by hand, it is desirable to reduce the distance the solid surface material needs to be carried. Thus, according to the present invention, the solid surface construction material is brought directly onto the worksite, possibly carried by the trailer itself. By laying out a template (that is, marking) directly on the solid surface material, the need for the conventional temporary template, as discussed above, is obviated. In particular, with the increased accuracy of subsequent fabrication, an additional fitting or adjusting step is virtually eliminated when the fabricated solid surface material is put into place. That is, the fabrication, done according to the present invention, is made so much more accurate that little if any adjustment has to be made in order for the fabricated piece to fit as desired. This virtual elimination of a complete step is a significant part of the time and work savings.

While the present invention has been described with respect to what are believed to be the most practical embodiments thereof, it is particularly noted that this is by way of example only, and appropriate modifications and variations thereof are possible within the spirit and scope of the claims appended hereto.

What is claimed is:

1. A mobile solid surface material fabricating unit in which workers are able to fabricate a solid surface material to be fabricated, the fabricating unit comprising:

a hollow body supported on wheels, said body having a forward end and a rear end and side walls extending therebetween, a floor and a ceiling, an interior of said body being provided with:

a plurality of spaced apart supports that define a solid surface support that extends on a substantially horizontal plane for supporting the solid surface material to be fabricated such that solid surface material to be fabricated extends across at least two of the supports so as to define a region beneath the solid surface material to be fabricated extending from the floor to the solid surface material to be fabricated and a region above the solid surface material to be fabricated corresponding to a region where a worker's face will ordinarily be while working on the solid surface material to be fabricated;

a plurality of electrical outlets distributed about said interior;

means for supplying electricity to said plurality of electrical outlets;

climate control means located relative to the solid surface support, such that the surface temperature of the solid surface material to be fabricated can be affected by the climate control means;

a lighting system constructed and arranged to illuminate said interior;

an air circulation system constructed and arranged to move air within said interior, the air circulation system including air intake means located in the region above the solid surface material to be fabricated corresponding to a region where a worker's face will ordinarily be while working on the solid surface material to be fabricated so that the air intake can ventilate air and draw air conditioning suspended solids into the air intake; and wherein said body is provided with at least one door in communication with an exterior of said body, and wherein the climate control means and air circulation system are constructed and located such that the surface temperature of the solid surface material to be fabricated can be affected by the climate control means at the same time that the region where a worker's face will ordinarily be while working on the solid surface material to be fabricated is ventilated.

2. The fabricating unit according to claim 1, wherein at least a portion of the surface area of the ceiling is made of translucent light transmitting material and wherein said portion of the ceiling is located so as to provide diffuse natural lighting of the solid surface material to be fabricated.

3. The fabricating unit according to claim 1, wherein said means for supplying electricity comprises a generator unit powered by fuel that is transportable with the fabrication unit and the fabrication unit includes means for using the generator unit to supply electricity to the plurality of electrical outlets, the climate control means, the lighting system and the air circulation system whereby the fabrication unit may be used to fabricate solid surface material at locations that are entirely remote from any external power source.

4. The fabricating unit of claim 1, wherein the fabricating unit includes at least one outlet for every two linear feet of body length and a plurality of said outlets being arranged proximate the plurality of supports so that at least one outlet will be within normal reach of a worker working on the solid surface material to be fabricated when the solid surface material to be fabricated is supported on the plurality of supports.

5. The fabricating unit according to claim 1, wherein said air circulation system comprises an exhaust fan and an exhaust duct connected to said exhaust fan, said exhaust duct being provided with at least one air inlet,
   wherein said air circulation system is constructed and arranged to draw air from the region above the solid surface material to be fabricated corresponding to a region where a worker's face will ordinarily be while working on the solid surface material to be fabricated and discharge said air to said exterior of said body.

6. The fabricating unit according to claim 5, wherein said air circulation system includes an air filter unit constructed and arranged to filter said air drawn from the region above the solid surface material to be fabricated corresponding to a region where a worker's face will ordinarily be while working on the solid surface material to be fabricated.

7. The fabricating unit according to claim 5, wherein said exhaust duct is provided with a plurality of air inlets, each being selectively openable and closeable and each said air inlet being located proximate a portion of the region above the solid surface material to be fabricated so that the air intake at each air inlet may be selectively controlled by a worker such that the worker may open and close the intakes so as to obtain different levels of air intake at different portions of the region above the solid surface material to be fabricated.

8. The fabricating unit according to claim 1, wherein the air circulation system comprises ventilation means having a capacity of at least 100 cubic feet per minute for every linear foot of body length whereby the region above the solid surface material to be fabricated corresponding to a region where a worker's face will ordinarily be while working on the solid surface material to be fabricated is well ventilated even when dust is generated by the fabrication of the solid surface material to be fabricated.

9. The fabricating unit according to claim 1, wherein said lighting system comprises a panel made from a translucent light-transmitting material arranged in said body to transmit diffuse ambient light from said exterior to said interior, the panel being located relative to the support for supporting the solid surface material to be fabricated so as to illuminate the solid surface material with diffuse natural light.

10. The fabricating unit according to claim 1, wherein a plurality of outlets are arranged along one of the side walls of the body such that there is no more than three feet between outlets and there is at least one outlet for every two linear feet of side wall length and wherein a plurality of said outlets are arranged proximate the plurality of supports so that at least one outlet will be within normal reach of a worker working on the solid surface material to be fabricated when the solid surface material to be fabricated is supported on the plurality of supports.

11. The fabricating unit according to claim 1, wherein said plurality of supports are provided along one said side wall and extend along a direction laterally across said interior and each said support comprises a first portion that is secured to and extends outward from the wall at a predetermined height, and a second portion that is supported at a predetermined height by the first portion but is extensibly moveable toward and away from the side wall relative to said first portion whereby the height of the supports is fixed relative to the side wall and one another to provide a fixed height support, but the supports are adjustable to accommodate different shapes of solid surface material to be fabricated.

12. The fabricating unit according to claim 11, wherein said second portion is made from a sacrificial material such that at least a portion of the solid surface material to be fabricated is supported on a support that can be cut with solid surface fabricating tools during the fabrication process without damaging the tools.

13. The fabricating unit of claim 1, further comprising means for illuminating the solid surface material with diffuse natural light.

14. The fabricating unit of claim 1, further comprising means for maintaining the temperature of at least a portion of the solid surface material to be fabricated within a predetermined temperature range when adhesive is applied to said portion of the solid surface material to be fabricated.

15. The fabricating unit of claim 1, wherein the climate control means is located beneath the solid surface support.

16. The fabricating unit of claim 1, wherein said air circulation system comprises an exhaust fan and an exhaust duct connected to said exhaust fan, said exhaust duct being provided with a plurality of air inlets, each being selectively openable and closeable and each air inlet being located proximate a portion of the region above the solid surface material to be fabricated so that the air intake at each air inlet may be selectively controlled by a worker such that the worker may open and close the intakes so as to obtain different levels of air intake at different portions of the region above the solid surface material to be fabricated.

17. The fabricating unit of claim 7, wherein the exhaust duct has one end connected to the exhaust fan and one end remote therefrom and wherein the duct is smaller at the remote end.

18. A mobile solid surface material fabricating unit in which workers are able to fabricate a solid surface material to be fabricated, the fabricating unit comprising:
   a hollow body, the body having a forward end and a rear end and side walls extending therebetween, a floor and a ceiling, an interior of said body being provided with:
      a plurality of supports spaced along the length of the fabrication unit so as to define a solid surface support that extends on a substantially horizontal plane for supporting the solid surface material to be fabricated such that solid surface material to be fabricated extends across at least two of the supports so as to define a region beneath the solid surface material to be fabricated and a region above the solid surface material to be fabricated corresponding to a region where a worker's face will ordinarily be while working on the solid surface material to be fabricated;

climate control means located relative to the solid surface support, such that the surface temperature of the solid surface material to be fabricated can be affected by the climate control means;

an air circulation system constructed and arranged to draw air from the region above the solid surface material to be fabricated corresponding to a region where a worker's face will ordinarily be while working on the solid surface material to be fabricated and discharge said air to said exterior of said body, the air circulation system comprising an exhaust duct extending along a side wall of the body, the exhaust duct including a plurality of air inlets that allow air to be drawn into the exhaust duct, each air inlet being selectively openable and closeable and each said air inlet being located proximate a portion of the region above the solid surface material to be fabricated so that the air intake at each air inlet may be selectively controlled by a worker such that the worker may open and close the intakes so as to obtain different levels of air intake at different portions of the region above the solid surface material to be fabricated;

a lighting system constructed and arranged to illuminate said interior;

wherein said body is provided with at least one door in communication with an exterior of said body.

19. The fabricating unit of claim 18, wherein the climate control means and air circulation system are constructed and located such that the surface temperature of the solid surface material to be fabricated can be affected by the climate control means at the same time that the region where a worker's face will ordinarily be while working on the solid surface material to be fabricated is ventilated.

\* \* \* \* \*